March 22, 1932.   D. C. HEITSHU   1,850,717
TRACTOR CULTIVATOR
Filed July 6, 1931
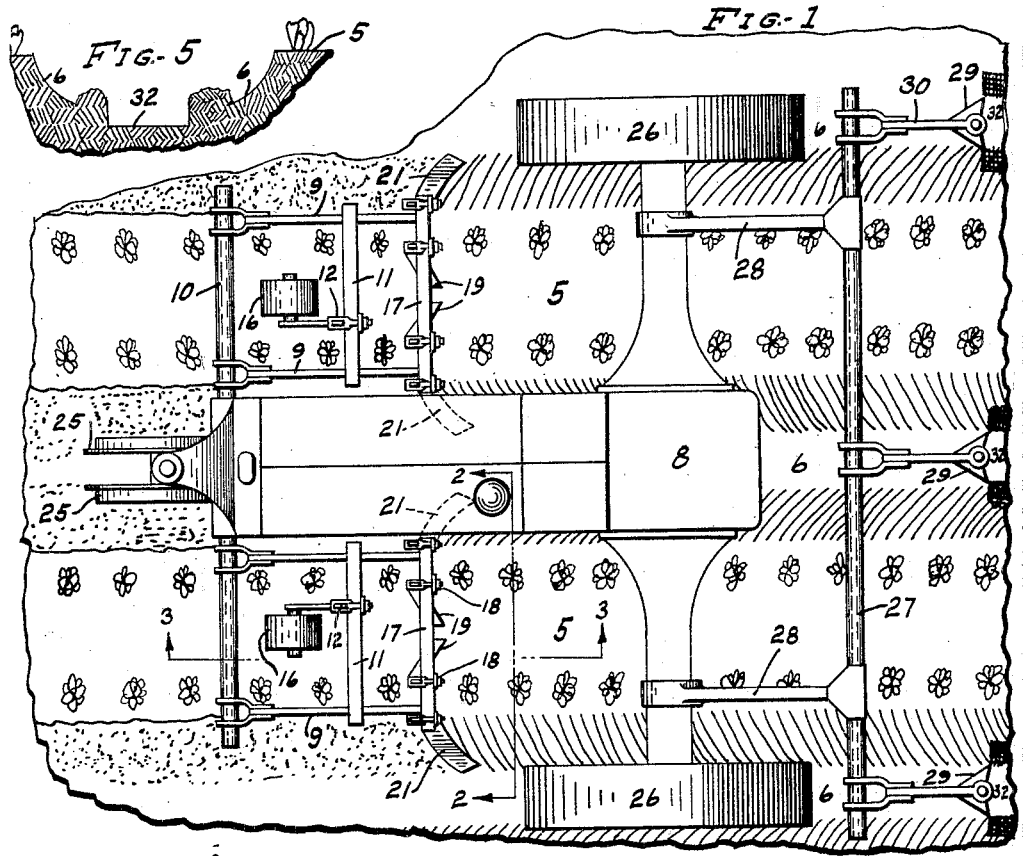
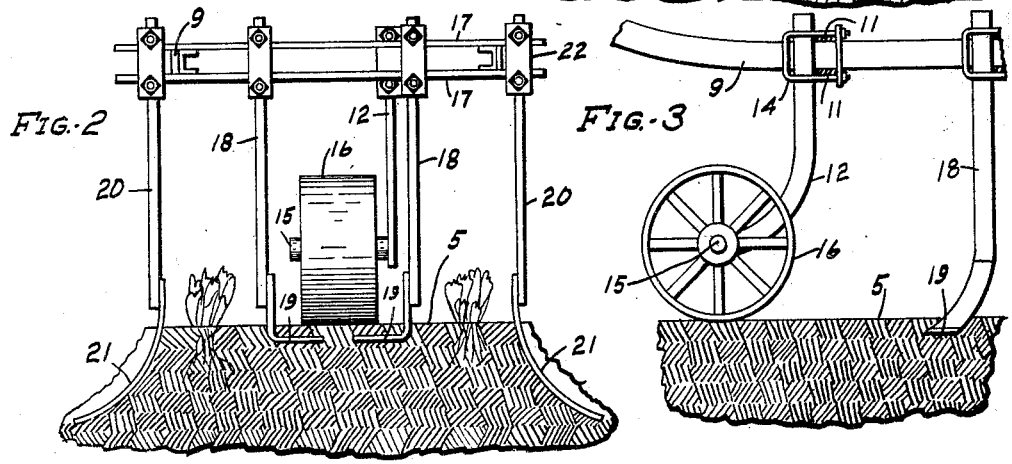
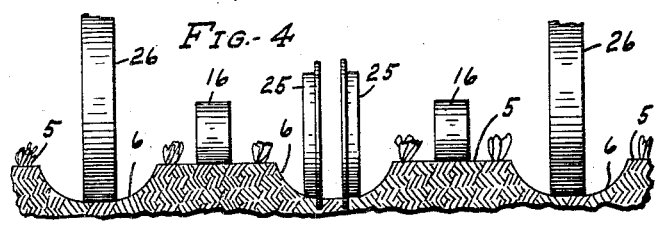
INVENTOR.
DANIEL C. HEITSHU
BY James A. Walsh
ATTORNEY.

Patented Mar. 22, 1932

1,850,717

UNITED STATES PATENT OFFICE

DANIEL C. HEITSHU, OF RACINE, WISCONSIN, ASSIGNOR TO J. I. CASE COMPANY, OF RACINE, WISCONSIN, A CORPORATION

TRACTOR CULTIVATOR

Application filed July 6, 1931. Serial No. 548,735.

My invention relates to cultivators particularly adapted for use in tilling irrigated land prepared for the growth of vegetables by which I am enabled to effectively cultivate and weed beds and the ditches or furrows therebetween, and maintain them in suitable condition, as well as to properly disintegrate and trench the ditches to readily absorb moisture contained therein, my object being to provide a tractor operated cultivator, although animal drawn implements equipped with my improvements may be satisfactorily employed, as will hereinafter appear.

In the accompanying drawings, forming part hereof, Figure 1 is a plan view of a tractor-cultivator embodying my improvements, certain levers and other detail construction being omitted from the tractor for purposes of clearness; Fig. 2, a transverse vertical sectional view taken on the dotted line 2—2 in Fig. 1; Fig. 3, a longitudinal sectional view taken on the dotted line 3—3 in Fig. 1; Fig. 4, a view looking from the rear, the tractor and the cultivator frames being omitted, to clearly show the relation of the tractor wheels and the cultivator wheels to each other and also their relation to the land being cultivated; and Fig. 5 is a detail illustrating a trench formed in a ditch by one of the cultivator shovels.

In said drawings I have illustrated my improved tractor cultivator as applied to irrigated land prepared for the production of lettuce, which is arranged in rows in leveled ridges or beds 5 positioned between ditches 6 in parallel relation, such beds and complementary ditches commonly extending straightaway an appreciable distance according to land areas, in some instances being approximately half mile in length. The beds 5 when prepared by tilling are smooth and level, as indicated in Figs. 2 and 4, while the ditches 6 at each side thereof are considerably lower, and the manner of arrangement is of a character to accommodate the wheels of my improved tractor-cultivator as will now be explained.

The tractor 8 may be of any desired construction, and is provided at each of its forward sides with substantially duplicate frames including drawbars 9 secured to a supporting bar 10 on the tractor or otherwise. To the crossbar 11 of said frame or in other desired manner I secure a wheel-supporting standard 12 by means of clips or U-bolts 14 in a manner to be vertically adjusted, and which standard may be forwardly curved as indicated in Fig. 3 or of other appropriate formation so that an axle 15 may be mounted thereon for supporting a guide and gage wheel 16 having a widened rim, as shown in Fig. 2, for a purpose to appear. Rearwardly of said wheel 16 I mount a tool-bar 17 forming part of the frame structure, which supports standards 18, the lower ends of which standards may be provided with weeding knives 19 or other tools, those illustrated being positioned at an angle to the direction of travel of the cultivator and adapted for cutting the weeds, disintegrating and cultivating the soil. At opposite sides of the frame beyond the knives 19 I provide standards 20 which at their lower ends carry ridge knives 21 of curved or other formation, said standards being secured to the tool-bar 17, as at 22, in any desired manner.

The tractor, as is common, is supported by a forward wheel or a pair of closely assembled steering wheels 25, and by rear driving wheels 26, the distance between the latter being so regulated that they will fit into and travel through the ditches 6 astride two beds 5, while the forward steering wheels traverse the intermediate ditch substantially in the relative position indicated in Fig. 4. A toolholding bar 27 is supported by suitable arms 28 or otherwise associated with the tractor, and carries cultivator shovels 29 connected to the bar by supports 30 in a well known manner, these shovels being so positioned as to travel through the ditches 6 in the manner indicated in Figs. 1 and 5. It will be understood that the tractor and the cultivator gangs are provided with levers and other devices for vertically adjusting the forward and rear gangs in relation to the soil, as well as other equipment, but as such devices and attachments are no part of my present invention they have been omitted from the drawings for purposes of clearness and further reference thereto will not be necessary.

In producing vegetables in localities where the land is prepared for irrigation, as commonly practiced, the depth of cultivation by the tools has been gaged by the cultivator or tractor wheels, Fig. 4, traveling in the ditches or furrows, but as inequalities in the surface of the soil exist in the way of slight elevations and depressions, and as such inequalities are also present in the bed, it will be apparent that the tools will not cultivate uniformly and that portions of the cultivation will be more shallow than others, with the result that the plants will vary in development and be of more or less inferior quality. As crops of uniformly developed and high grade plants are essential both for economic reasons and commercial success, it is requisite that cultivation of the soil shall be of uniform depth and well mulched. This I accomplish by utilizing the surface of the bed instead of the ditches for controlling the depth of the tools by engaging the surface with the wheel 16. As the cultivator gangs are drawn along the beds, the wheels 16 with the tractor wheels guide the forward gangs in a straight course so that the weeding knives 19 will stir the soil and cut the weeds and other growths therein between the plant rows, thus mixing the soil and cut material to such extent as to form a mulch to be distributed about the plants by the weeding knives. These forward gangs, as will be understood, are pivotally mounted upon the supporting bar 10 so that as the gage wheel passes over slight inequalities, the weeding knives thus gaged and closely following in its wake cultivate correspondingly and maintain a substantially uniform depth regardless of undulations or irregularities of the bed surface, and the rows of plants at the sides thereof are likewise uniformly cultivated and mulched. During the operation described the ridge knives or tools 21 are cutting away and trimming the sloping sides of the beds into symmetrical formation and throwing the dirt and weeds into the middle of the ditch, which portion is at the same time being cultivated by the shovels 29, each of which cuts a trench through the ditch in which it is drawn, as indicated at 32 in Fig. 5, so that the dirt and weeds from both sides and middle become mingled to form a mulch for the ditch while the ditch is clear and of sufficient depth to contain the necessary water supply. It will thus be seen that simultaneously with the cultivating operation of the bed the ditches at either side are being conditioned for the reception and absorption of water for sufficiently moistening the beds, and that I obtain a uniformity of cultivation not heretofore possible by the methods commonly employed so far as I am aware.

I claim as my invention:

1. In a cultivator, a frame element, a cultivating tool on the frame, a wheel adjacent the tool and traveling on top of a bed for gaging the depth of the tool therein, and a tool on said frame for cutting and trimming the side of a bed.

2. In a cultivator, a frame element adapted to travel over a bed, an implement supported by the frame for cultivating the top of the bed, a wheel on the frame for gaging the depth of the implement, and an implement on the frame extending downwardly along the side of the bed for simultaneously trimming the side as the bed is being cultivated.

3. In a cultivator having wheels adapted to travel in ditches, a frame adapted to travel over a bed between said wheels, means on the frame for cultivating the surface of the bed, means on the frame for gaging the depth of the cultivating means in the bed, and means on the frame for simultaneously trimming the side of the bed as the surface thereof is being cultivated.

4. In a cultivator having wheels adapted to travel in ditches, a frame adapted to travel over a bed between said wheels, standards supported on the frame, implements at the lower end of the standards for cultivating the surface of the bed, a gage wheel supported on the frame and traveling on top of the bed for controlling the depth of the implements, and means on the frame for simultaneously trimming the side of the bed as the latter is being cultivated.

5. The combination, with a tractor having a draft member, a frame connected to and drawn by said member, an adjustable depth gaging wheel mounted on the frame, weeding knives on said frame in rear of the wheel for cultivating a bed, and ridge knives disposed at opposite sides of the frame and extending below the weeding knives for trimming the sides of said bed.

6. The combination, with a tractor, of a frame, means on the frame for cultivating a bed, means on the frame for controlling the depth of said cultivating means, means on the frame for trimming the sides of the bed, and means connected to the tractor for cultivating and trenching a ditch at the side of the bed.

7. In combination with a tractor having draft means, a frame including means for connecting it to said draft means, a depth gaging wheel supported by the frame, a weeding knife supported by the frame and positioned at an angle to the direction of travel of the tractor for cultivating an elevated bed, a knife on said frame extending below the weeding knife for trimming the side of the bed, and a tool positioned at the rear of the tractor for cultivating a ditch lying parallel with the bed and simultaneously with the cultivation of the bed by said weeding knife.

8. In a cultivator having a frame, a standard supported thereby, a depth gage wheel mounted on the standard, a pair of standards supported on the frame in rear of the gage wheel, weeding knives on said standards for cultivating soil in the path of the gage wheel, vertical supports connected to the frame having cutting means extending below the weeding knives for trimming the sides of a bed, and means behind and lower than said weeding knives for cultivating a ditch at the side of the bed.

9. A tractor cultivator having frame members disposed at opposite sides of the tractor, tools on the frames for cultivating the surfaces of beds separated by ditches, a wheel for guiding the tools on the bed and for gaging the depth of said tools, knives on the frames extending lower than said cultivating tools for trimming the sides of beds, and tools associated with the tractor in the rear of said knives for cultivating ditches at the sides of the beds.

10. In a cultivator for tilling an elevated bed and irrigation ditches alongside thereof, a tractor having wheels adapted to travel through the ditches, a cultivator frame having a gage-wheel traveling on top of the bed, cultivating means supported by the frame in the path of the wheel for stirring and weeding the bed and mulching plants, said gage-wheel controlling the depth of the cultivating means, means on the frame for trimming and weeding the sides of the bed and discharging dirt and cut weeds into a ditch, and means in the rear of said trimming and weeding means for trenching, cultivating and mulching the ditch.

In testimony whereof I affix my signature.

DANIEL C. HEITSHU.